United States Patent
Lan et al.

(10) Patent No.: US 10,209,552 B2
(45) Date of Patent: Feb. 19, 2019

(54) PDLC DISPLAY PANEL, MANUFACTURING METHOD THEREOF, AND LCD

(71) Applicant: Shenzhen China Star Optoelectronics Technology Co., Ltd., Shenzhen (CN)

(72) Inventors: Song Lan, Shenzhen (CN); Yungjui Lee, Shenzhen (CN); Ji Li, Shenzhen (CN); Xiaolong Ma, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 148 days.

(21) Appl. No.: 14/912,611

(22) PCT Filed: Dec. 28, 2015

(86) PCT No.: PCT/CN2015/099274
§ 371 (c)(1),
(2) Date: Feb. 18, 2016

(87) PCT Pub. No.: WO2017/071060
PCT Pub. Date: May 4, 2017

(65) Prior Publication Data
US 2017/0261778 A1    Sep. 14, 2017

(30) Foreign Application Priority Data
Oct. 29, 2015  (CN) .......................... 2015 1 0716815

(51) Int. Cl.
*G02F 1/1368* (2006.01)
*G02F 1/1334* (2006.01)
(Continued)

(52) U.S. Cl.
CPC .......... *G02F 1/1334* (2013.01); *G02F 1/1335* (2013.01); *G02F 1/1339* (2013.01);
(Continued)

(58) Field of Classification Search
CPC ..................................................... G02F 1/1334
See application file for complete search history.

(56) References Cited

U.S. PATENT DOCUMENTS 5,905,556 A * 5/1999 Suzuki .............. G02F 1/134363
349/141
6,294,313 B1 * 9/2001 Kobayashi ....... B29D 11/00365
101/453

(Continued)

FOREIGN PATENT DOCUMENTS

| CN | 102707481 A | 10/2012 |
| CN | 203658706 U | 6/2014 |
| CN | 204188921 U | 3/2015 |

*Primary Examiner* — Sang V Nguyen
(74) *Attorney, Agent, or Firm* — Leong C. Lei (57) ABSTRACT

The invention provides a PDLC display panel, manufacturing method thereof, and an LCD. The PDLC display panel comprises a PDLC layer, which comprising a plurality of red sub-pixel portions, green sub-pixel portions, and blue sub-pixel portions. The red, green and blue sub-pixel portion is a PDLC film having red, green and blue dye, respectively. The light passing through the red, green, and blue sub-pixel portions of the PDLC layer displays red, green and blue colors respectively. The PDLC display panel is simple in structure, on the premise to achieve color display, eliminating the upper and lower polarizers, polyimide (PI) alignment layer, CF layer and the black matrix, to achieve high light penetration rate and low manufacturing costs, as well as high backlight utilization with the use of quantum dot layer in the CF substrate.

6 Claims, 6 Drawing Sheets

(51) Int. Cl.
    *G02F 1/1335*     (2006.01)
    *G02F 1/1339*     (2006.01)
    *G02F 1/1343*     (2006.01)
    *G02F 1/1362*     (2006.01)

(52) U.S. Cl.
    CPC ...... *G02F 1/1368* (2013.01); *G02F 1/133514* (2013.01); *G02F 1/133621* (2013.01); *G02F 1/134309* (2013.01); *G02F 1/136286* (2013.01); *G02F 2001/13345* (2013.01); *G02F 2001/134345* (2013.01); *G02F 2201/121* (2013.01); *G02F 2201/123* (2013.01); *G02F 2202/36* (2013.01)

(56)              References Cited

U.S. PATENT DOCUMENTS

| | | | | |
|---|---|---|---|---|
| 2001/0010575 A1* | 8/2001 | Yoshida | ............ | G02F 1/134363 349/141 |
| 2002/0131005 A1* | 9/2002 | Yang | ................ | G02F 1/134363 349/141 |
| 2003/0107697 A1* | 6/2003 | Yang | ................ | G02F 1/134363 349/141 |
| 2008/0316395 A1* | 12/2008 | O'Keeffe | ............. | C09K 19/544 349/88 |
| 2010/0309413 A1* | 12/2010 | Jang | ..................... | G02F 1/1334 349/86 |
| 2011/0124153 A1* | 5/2011 | Hosoba | ............ | H01L 21/02554 438/104 |
| 2011/0261303 A1* | 10/2011 | Jang | ................... | G02F 1/13318 349/108 |
| 2012/0038852 A1* | 2/2012 | Jang | ...................... | G02F 1/1334 349/86 |
| 2013/0135558 A1* | 5/2013 | Kim | .................. | G02F 1/133528 349/62 |
| 2014/0168576 A1* | 6/2014 | Lee | ......................... | H01J 29/90 349/71 |
| 2014/0347718 A1* | 11/2014 | Duthaler | .............. | G02F 1/1334 359/296 |
| 2014/0353630 A1* | 12/2014 | Baek | ..................... | H01L 51/525 257/40 |
| 2015/0048348 A1* | 2/2015 | Huang | ................. | H01L 27/322 257/40 |
| 2015/0185556 A1* | 7/2015 | Arai | ..................... | G02F 1/1334 349/43 |
| 2015/0378189 A1* | 12/2015 | Kim | .................... | H01L 51/5268 349/86 |
| 2016/0084476 A1* | 3/2016 | Koole | ................... | C09K 11/02 362/84 |
| 2016/0085129 A1* | 3/2016 | Cammenga | ............ | B60R 1/088 359/275 |
| 2016/0195775 A1* | 7/2016 | Lee | ....................... | G02F 1/1368 349/43 |
| 2016/0209706 A1* | 7/2016 | Miki | ................. | G02F 1/133617 |
| 2016/0300535 A1* | 10/2016 | Gilbert | ..................... | G09G 3/36 |
| 2016/0327719 A1* | 11/2016 | Kitahara | ................. | G02B 1/14 |
| 2016/0372528 A1* | 12/2016 | Kamura | .............. | H01L 51/0096 |

\* cited by examiner

PDLC DISPLAY PANEL, MANUFACTURING METHOD THEREOF, AND LCD

BACKGROUND OF THE INVENTION

1. Field of the Invention

The present invention relates to the field of display, and in particular to a polymer dispersed liquid crystal (PDLC) and manufacturing method thereof, and a liquid crystal display (LCD).

2. The Related Arts

The polymer dispersed liquid crystal (PDLC) is to mix the low-molecular liquid crystal (LC) with the pre-polymer, to form micron-sized liquid crystal droplets uniformly dispersed in a polymer network by a polymerization reaction under certain conditions, and then use a dielectric anisotropy of liquid crystal molecules to obtain a material having an electro-optical characteristics of responses, to realize a bright state when conductive and dark state when cut-off, with the main function to express a grayscale between the scattering state and a transparent state.

PDLC film is a membrane material with excellent integrated performance formed by combining LC and polymer. The LC gives the PDLC the obvious electro-optical properties, which attracts much attention, with the prospect of a wide range of applications. Compared with the traditional display devices, the PDLC display has many advantages, such as, no polarizing plates and the alignment layer is required, the production process is simple, easy to make into large-area flexible displays, and so on. Thus, the PDLC technology has been applied to the optical modulator, thermal and pressure-sensitive device, electronically controlled glass, shutters, projection displays, e-books and so on.

The currently available liquid crystal displays (LCD) are mostly of the 4 backlight type LCD, which comprises an LCD panel and a backlight module. Typically, the LCD panel comprises a color filter (CF) substrate, a thin film transistor (TFT) substrate, and the LC, sealant and polarizer sandwiched between the CF substrate and the TFT substrate. However, the LCD panel of this structure shows a strong effect on light absorption and filtering, for example, the upper and lower polarizers can usually filter and absorb more than 55% v of the light. The CF can absorb about ⅔ of the light. As a result, only 5-8% of the backlight is utilized in the known LCD.

The newly emerging quantum dot materials for excellent emission characteristics, such as, narrow emission peak, tunable luminescent band, high internal quantum efficiency of the display industry, brings a new space for color development.

Therefore, the combination of PDLC and quantum dot technologies to form new display will be the focus of display industry.

SUMMARY OF THE INVENTION

The object of the present invention is to provide a PDLC display panel, simple in structure, on the premise to achieve color display, eliminating the upper and lower polarizers, polyimide (PI) alignment layer, CF layer and the black matrix, to achieve high light penetration rate and low manufacturing costs, as well as high backlight utilization.

Another object of the present invention is to provide a manufacturing method for PDLC display panel, to manufacture a PDLC display panel that is simple in structure, on the premise to achieve color display, eliminating the upper and lower polarizers, polyimide (PI) alignment layer, CF layer and the black matrix, to achieve high light penetration rate and low manufacturing costs, as well as high backlight utilization.

Yet another object of the present invention is to provide a LCD, with a PDLC display panel, simple in structure and achieve high light penetration rate and high backlight utilization.

To achieve the above object, the present invention provides a PDLC display panel, which comprises: a thin film transistor (TFT) substrate, a color filter (CF) substrate, a PDLC layer sandwiched between the TFT substrate and the CF substrate, and a seal layer adhering the TFT substrate to the CF substrate; the CF substrate comprising a second substrate, a common electrode disposed on the second substrate, and a color stop wall disposed on the common electrode; the color stop wall and the second substrate defining to form a plurality of pixel areas, with each pixel areas comprising a red sub-pixel groove, a green sub-pixel groove and a blue sub-pixel groove; the PDLC layer comprising: a red sub-pixel portion, a green sub-pixel portion, and a blue sub-pixel portion disposed respectively inside the red sub-pixel groove, the green sub-pixel groove and the blue sub-pixel groove; the red sub-pixel portion being a PDLC film having red dye, functioning as a filter to allow only red light to pass, the green sub-pixel portion being a PDLC film having green dye, functioning as a filter to allow only green light to pass, and the blue sub-pixel portion being a PDLC film having blue dye, functioning as a filter to allow only blue light to pass.

The CF substrate further comprises a quantum dot layer disposed on the second substrate, and a protective layer disposed on the second substrate and the quantum dot layer between the second substrate and the common electrode.

The quantum dot layer emits white light when excited by the backlight, and the quantum dot layer comprises red quantum dots, green quantum dots and blue quantum dot.

The seal layer comprises a sealing glue, and conductive glue disposed around the sealing glue; and the TFT substrate comprises: a first substrate, a plurality of gate scan lines and a plurality of data lines disposed on the first substrate, an insulation layer covering the first substrate and the gate scan lines, a pixel electrode disposed on the insulation layer, and a planarization layer covering the insulation layer and the pixel electrode.

The present invention also provides a manufacturing method for PDLC display panel, which comprises: Step 1: providing a TFT substrate and a CD substrate; the CF substrate comprising a second substrate, a common electrode disposed on the second substrate, and a color stop wall disposed on the common electrode; the color stop wall and the second substrate defining to form a plurality of pixel areas, with each pixel areas comprising a red sub-pixel groove, a green sub-pixel groove and a blue sub-pixel groove; Step 2: evenly mixing a red dye, a green dye and a blue dye respectively with LC molecules, photo initiators and pre-polymer to obtain a red LCD mixture, a green LC mixture, and a blue LC mixture; Step 3: infusing the red sub-pixel groove, green sub-pixel groove and blue sub-pixel groove with the red LCD mixture, green LC mixture and blue LC mixture respectively; Step 4: coating a sealing glue on the CF substrate or the TFT substrate, and coating a conductive glue around the sealing glue, then aligning to attach the TFT substrate and the CF substrate in a vacuum environment and curing the sealing glue to obtain an LC box; Step 5: performing UV radiation on the LC box so that the photo initiators and the pre-polymer in the red LCD mixture, green LC mixture and blue LC mixture polymerized to form polymer, the red dye, green dye and blue dye evenly dispersed in the polymer network formed by the polymer to form an PDLC film having red dye, an PDLC film having green dye and a PDLC film having blue dye, respectively; and finally forming a PDLC layer having a plurality of red sub-pixel portions, a plurality of green sub-pixel portions and a plurality of blue sub-pixel portions; the UV light having a wavelength of 320-400 nm, luminance of 1-100 W/cm$^2$, and the radiation duration being 5-30 minutes.

In Step 5, the UV light has a wavelength of 365 nm, luminance of 85 W/cm$^2$, and the radiation duration is 15 minutes.

The CF substrate provided in Step 1 further comprises a quantum dot layer disposed on the second substrate, and a protective layer disposed on the second substrate and the quantum dot layer between the second substrate and the common electrode.

The quantum dot layer emits white light when excited by the backlight, and the quantum dot layer comprises red quantum dots, green quantum dots and blue quantum dot.

The present invention also provides an LCD, which comprises the above PDLC display panel and a backlight module, the backlight module being disposed at the side of the PDLC display panel closer to the CF substrate.

The backlight module comprises a light source emitting a light of white or blue color.

Compared to the known techniques, the present invention provides the following advantages: the present invention provides a PDLC display panel and manufacturing method thereof, and an LCD. The PDLC display panel comprises a PDLC layer, which further comprising a plurality of red sub-pixel portions, a plurality of green sub-pixel portions, and a plurality of blue sub-pixel portions. The red sub-pixel portion is a PDLC film having red dye, the green sub-pixel portion is a PDLC film having green dye, and the blue sub-pixel portion being a PDLC film having blue dye. The light passing through the red, green, and blue sub-pixel portions of the PDLC layer displays red, green and blue colors respectively. The PDLC display panel is simple in structure, on the premise to achieve color display, eliminating the upper and lower polarizers, polyimide (PI) alignment layer, CF layer and the black matrix, to achieve high light penetration rate and low manufacturing costs, as well as high backlight utilization with the use of quantum dot layer in the CF substrate. The PDLC display panel manufactured by the manufacturing method of the invention, is simple in structure, on the premise of achieve color display, eliminating the upper and lower polarizers, polyimide (PI) alignment layer, CF layer and the black matrix, to achieve high light penetration rate and low manufacturing costs, as well as high backlight utilization. The LCD of the invention utilizes the above PDLC display panel, is simple in structure and provides high light penetration rate and high backlight utilization.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
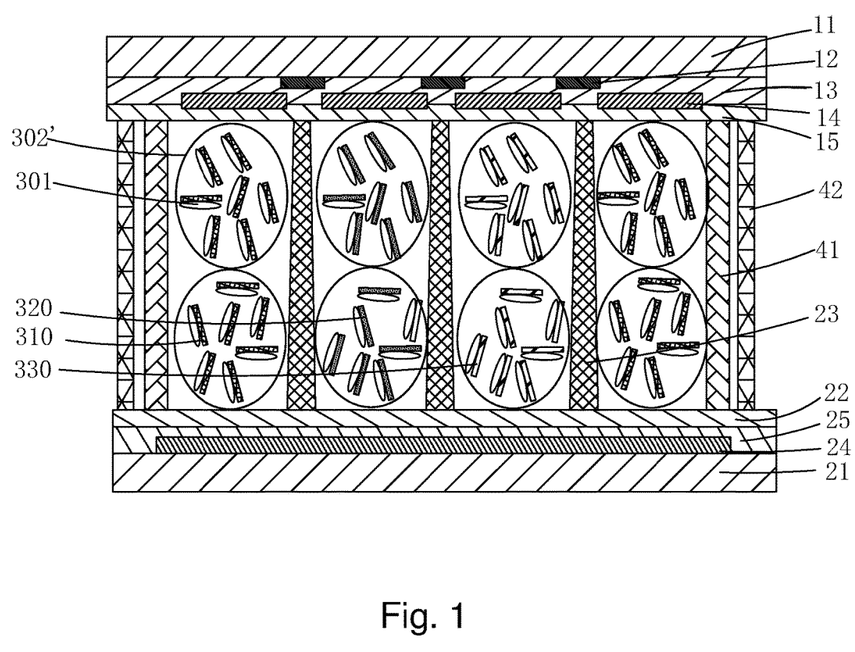
FIG. 1 is a cross-sectional view showing a PDLC display panel provided by an embodiment of the present invention.

Refer to FIG. 1. The present invention provides a PDLC display panel, which comprises: a thin film transistor (TFT) substrate, a color filter (CF) substrate, a PDLC layer sandwiched between the TFT substrate and the CF substrate, and a seal layer adhering the TFT substrate to the CF substrate.

Specifically, the seal layer comprises a sealing glue 41, and a conductive glue 42 disposed around the sealing glue 41.

Specifically, the TFT substrate comprises: a first substrate 11, a plurality of gate scan lines 12 and a plurality of data lines disposed on the first substrate 11, an insulation layer 13 covering the first substrate 11 and the gate scan lines 12, a pixel electrode 14 disposed on the insulation layer 13, and a planarization layer 15 covering the insulation layer 13 and the pixel electrode 14.

The CF substrate comprises a second substrate 21, a common electrode 22 disposed on the second substrate 21, and a color stop wall 23 disposed on the common electrode 22.

The color stop wall 23 and the second substrate 21 define and form a plurality of pixel areas, with each pixel areas comprising a red sub-pixel groove, a green sub-pixel groove and a blue sub-pixel groove.

The PDLC layer comprises: a red sub-pixel portion, a green sub-pixel portion, and a blue sub-pixel portion disposed respectively inside the red sub-pixel groove, the green sub-pixel groove and the blue sub-pixel groove; the red sub-pixel portion being a PDLC film having red dye 310, functioning as a filter to allow only red light to pass, the green sub-pixel portion being a PDLC film having green dye 320, functioning as a filter to allow only green light to pass, and the blue sub-pixel portion being a PDLC film having blue dye 330, functioning as a filter to allow only blue light to pass.

Specifically, to improve the backlight utilization rate of the PDLC display panel, the CF substrate further comprises a quantum dot layer 24 disposed on the second substrate 21, and a protective layer 25 disposed on the second substrate 21 and the quantum dot layer 24, and both are disposed between the second substrate 21 and the common electrode 22. When a light source (of white or blue color, preferably of blue color) enters from the CF substrate side, the quantum dot layer 24 emits white light when excited by the backlight, and the quantum dot layer 24 comprises red quantum dots, green quantum dots and blue quantum dot. The red quantum dots, green quantum dots and blue quantum dot emits red, green and blue lights respectively when excited by light, but the red, green and blue lights are mixed to display white light.

Specifically, the red dye 301, green dye 320 and blue dye 330 can selectively absorb light of other wavelength so that the PDLC layer shows the filtering property. The light passing the red sub-pixel portions, green sub-pixel portions and blue sub-pixel portions displays red, green and blue lights respectively. As such, the PDLC display panel does not require using a color filtering film layer and a black matrix.

Figure 2:
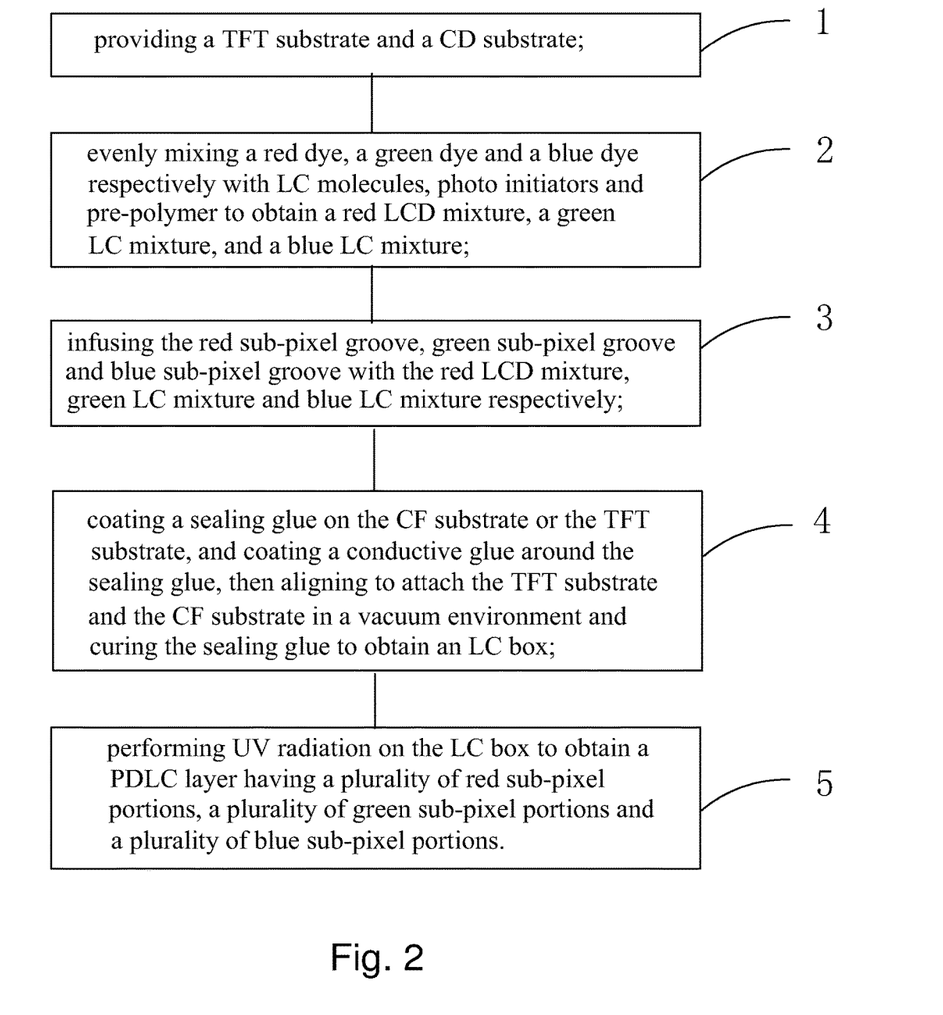
FIG. 2 is a schematic view showing the flowchart of the manufacturing method for PDLC display panel provided by an embodiment of the present invention.

Refer to FIG. 2. The present invention also provides a manufacturing method for PDLC display panel, which comprises:

Step 1: providing a TFT substrate and a CD substrate.

Specifically, the TFT substrate comprises: a first substrate 11, a plurality of gate scan lines 12 and a plurality of data lines disposed on the first substrate 11, an insulation layer 13 covering the first substrate 11 and the gate scan lines 12, a pixel electrode 14 disposed on the insulation layer 13, and a planarization layer 15 covering the insulation layer 13 and the pixel electrode 14.

The CF substrate comprises a second substrate 21, a common electrode 22 disposed on the second substrate 21, and a color stop wall 23 disposed on the common electrode 22.

The color stop wall 23 and the second substrate 22 define and form a plurality of pixel areas, with each pixel areas comprising a red sub-pixel groove, a green sub-pixel groove and a blue sub-pixel groove.

Specifically, the CF substrate further comprises a quantum dot layer 24 disposed on the second substrate 21, and a protective layer 25 disposed on the second substrate 21 and the quantum dot layer 24, and both are disposed between the second substrate 21 and the common electrode 22. When a light source (of white or blue color, preferably of blue color) enters from the CF substrate side, the quantum dot layer 24 emits white light when excited by the backlight, and the quantum dot layer 24 comprises red quantum dots, green quantum dots and blue quantum dot.

Step 2: evenly mixing a red dye 310, a green dye 320 and a blue dye 330 respectively with LC molecules 301, photo initiators and pre-polymer 302 to obtain a red LCD mixture, a green LC mixture, and a blue LC mixture.

Step 3: infusing the red sub-pixel groove, green sub-pixel groove and blue sub-pixel groove with the red LCD mixture, green LC mixture and blue LC mixture respectively.

Figure 3:
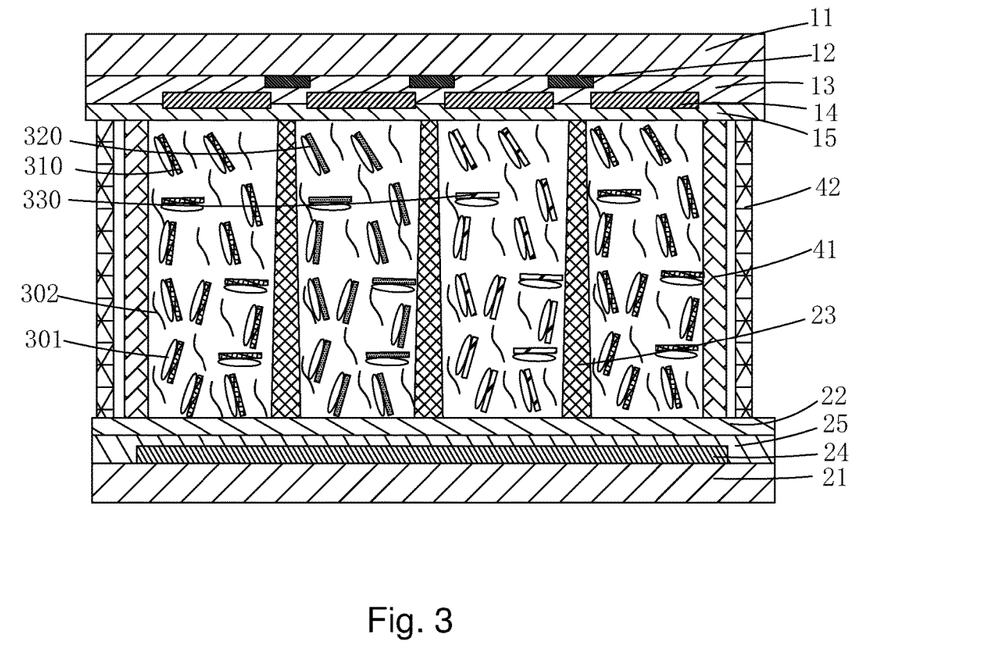
FIG. 3 is a schematic view showing the Step 4 of the manufacturing method for PDLC display panel provided by an embodiment of the present invention.

Step 4: as shown in FIG. 3, coating a sealing glue 41 on the CF substrate or the TFT substrate, and coating a conductive glue 42 around the sealing glue 41, then aligning to attach the TFT substrate and the CF substrate in a vacuum environment and curing the sealing glue to obtain an LC box.

Figure 4:
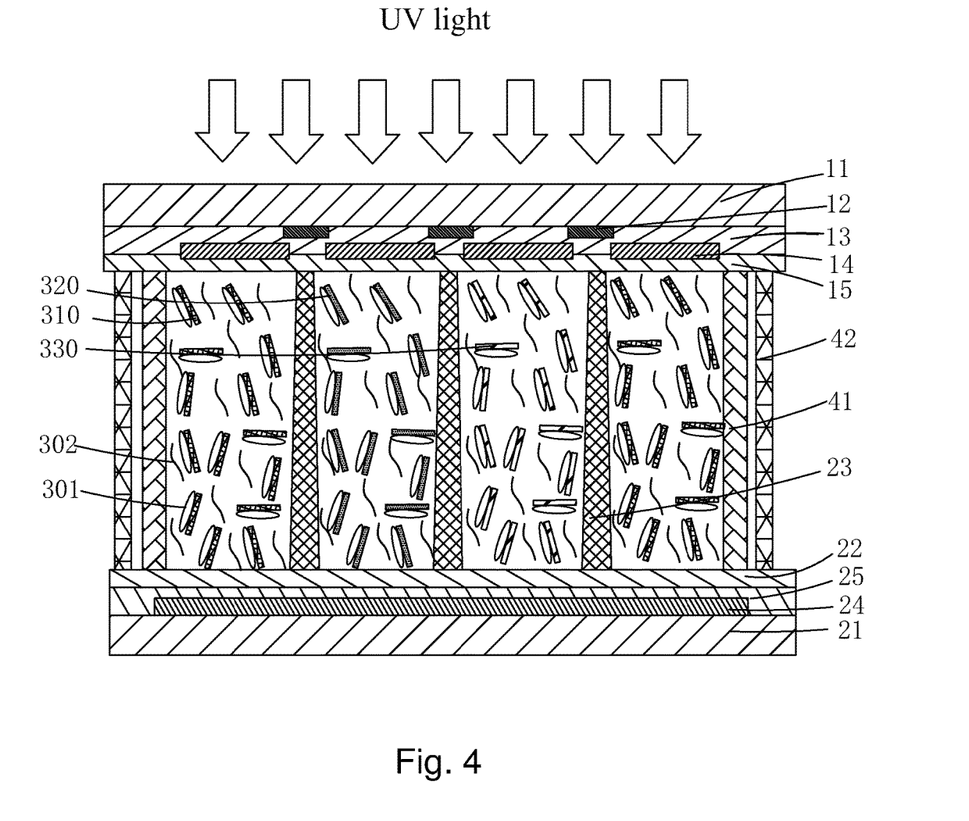
FIG. 4 is a schematic view showing the Step 5 of the manufacturing method for PDLC display panel provided by an embodiment of the present invention.

Step 5: as shown in FIG. 4, performing UV radiation on the LC box so that the photo initiators and the pre-polymer 302 in the red LCD mixture, green LC mixture and blue LC mixture polymerized to form polymer 302', the red dye 310, green dye 320 and blue dye 330 evenly dispersed in the polymer network formed by the polymer 302' to form an PDLC film having red dye 310, an PDLC film having green dye 320 and a PDLC film having blue dye 330, respectively; and finally forming a PDLC layer having a plurality of red sub-pixel portions, a plurality of green sub-pixel portions and a plurality of blue sub-pixel portions. At this point, the manufacturing of PDLC display panel is accomplished to obtain a PDLC display panel as shown in FIG. 1.

Specifically, in Step 5, the UV light has a wavelength of 320-400 nm, luminance of 1-100 W/cm$^2$, and the radiation duration being 5-30 minutes. Preferably, the UV light has a wavelength of 365 nm, luminance of 85 W/cm$^2$, and the radiation duration is 15 minutes.

Figure 5:
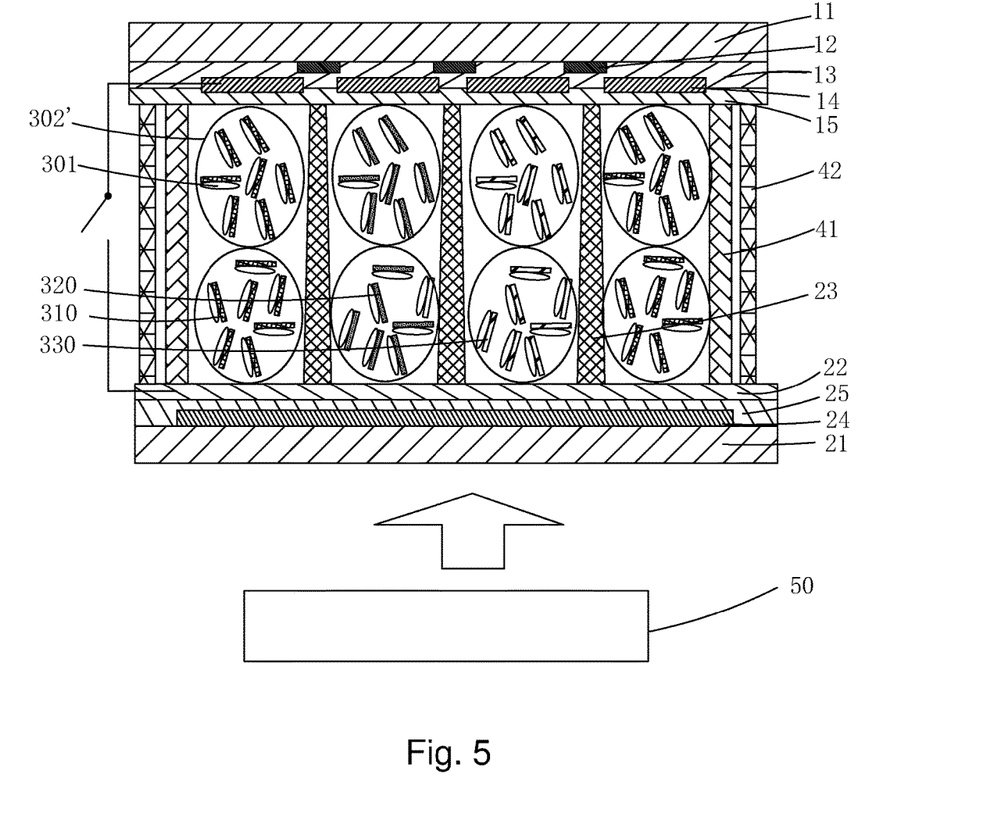
FIG. 5 is a schematic view showing the PDLC display panel not displaying light when no voltage is applied provided by an embodiment of the present invention.
Figure 6:
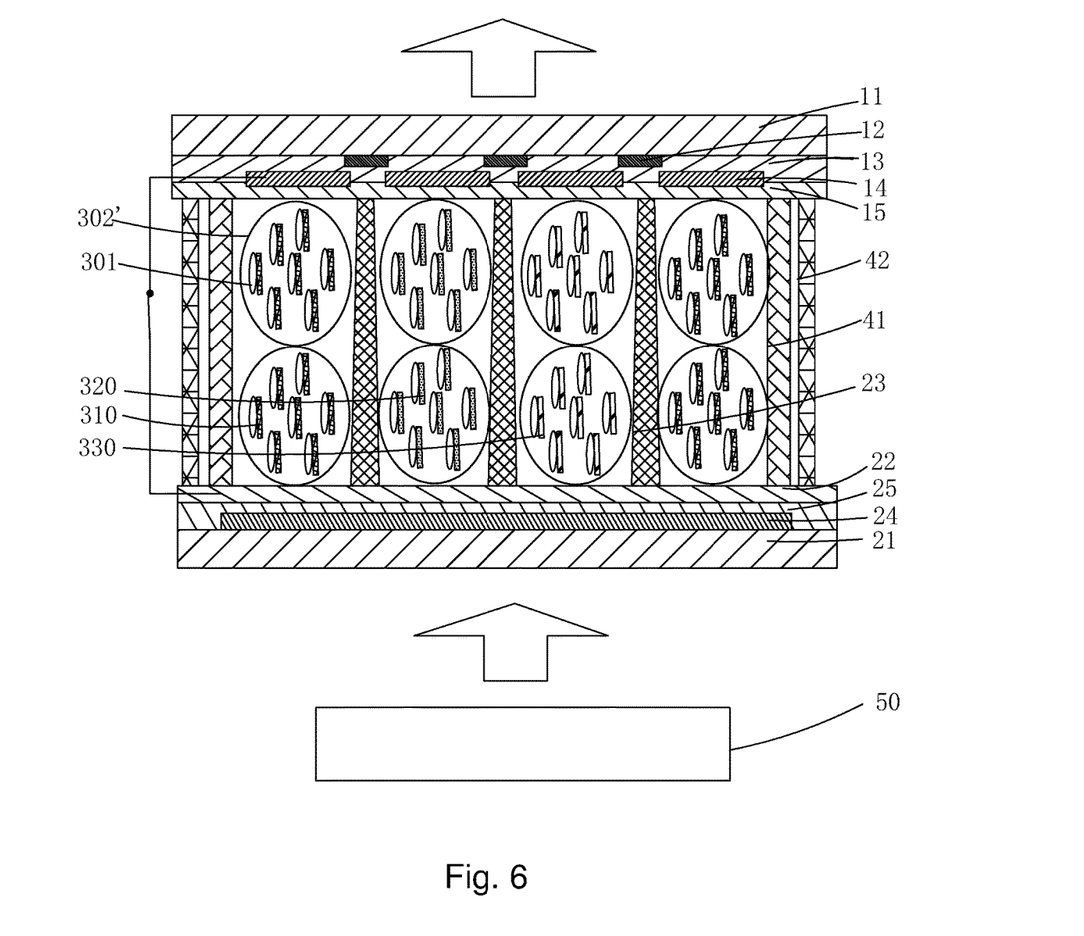
FIG. 6 is a schematic view showing the PDLC display panel displaying color when voltage is applied provided by an embodiment of the present invention.

Refer to FIG. 5 and FIG. 6. The present invention also provides an LCD, which comprises the above PDLC display panel and a backlight module 50. Specifically, the backlight module 50 is disposed at the side of the PDLC display panel closer to the CF substrate.

Specifically, the backlight module 50 comprises a light source emitting a light of white or blue color. Preferably, the light source is a blue light.

As shown in FIG. 5, when no voltage is applied to the LCD, the refraction rate no cannot match the refraction rate np of the polymer 302' because the LC molecules 301 of the PDLC layer are randomly scattered. As a result, the incident light is scattered randomly and normal display is impossible.

As shown in FIG. 6, when a voltage is applied to the LCD, the refraction rate no matches the refraction rate np of the polymer 302' to form a basically uniform material without a clear interface because the optical axis of the LC molecules 301 of the PDLC layer is perpendicular to the surface of the polymer 302', i.e., consistent with the electrical field. As a result, the incident light is able to pass. With the red dye 310, green dye 320 and blue dye 330 in the red sub-pixel portions, green sub-pixel portions and blue sub-pixel portions of the PDLC layer, the passing light can display red, green and blue lights to achieve displaying colors.

In summary, the present invention provides the present invention provides a PDLC display panel and manufacturing method thereof, and an LCD. The PDLC display panel comprises a PDLC layer, which further comprising a plurality of red sub-pixel portions, a plurality of green sub-pixel portions, and a plurality of blue sub-pixel portions. The red sub-pixel portion is a PDLC film having red dye, the green sub-pixel portion is a PDLC film having green dye, and the blue sub-pixel portion being a PDLC film having blue dye. The light passing through the red, green, and blue sub-pixel portions of the PDLC layer displays red, green and blue colors respectively. The PDLC display panel is simple in structure, on the premise to achieve color display, eliminating the upper and lower polarizers, polyimide (PI) alignment layer, CF layer and the black matrix, to achieve high light penetration rate and low manufacturing costs, as well as high backlight utilization with the use of quantum dot layer in the CF substrate. The PDLC display panel manufactured by the manufacturing method of the invention, is simple in structure, on the premise of achieve color display, eliminating the upper and lower polarizers, polyimide (PI) alignment layer, CF layer and the black matrix, to achieve high light penetration rate and low manufacturing costs, as well as high backlight utilization. The LCD of the invention utilizes the above PDLC display panel, is simple in structure and provides high light penetration rate and high backlight utilization.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A polymer dispersed liquid crystal (PDLC) display panel, which comprises: a thin film transistor (TFT) substrate, a color filter (CF) substrate, a PDLC layer sandwiched between the TFT substrate and the CF substrate, and a seal layer adhering the TFT substrate to the CF substrate;
   the CF substrate comprising a second substrate, a common electrode disposed on the second substrate, and a color stop wall disposed on the common electrode;
   the color stop wall and the second substrate defining to form a plurality of pixel areas, with each pixel areas comprising a red sub-pixel groove, a green sub-pixel groove and a blue sub-pixel groove; and
   the PDLC layer comprising: a red sub-pixel portion, a green sub-pixel portion, and a blue sub-pixel portion disposed respectively inside the red sub-pixel groove, the green sub-pixel groove and the blue sub-pixel groove; the red sub-pixel portion being a PDLC film having red dye, functioning as a filter to allow only red light to pass, the green sub-pixel portion being a PDLC film having green dye, functioning as a filter to allow only green light to pass, and the blue sub-pixel portion being a PDLC film having blue dye, functioning as a filter to allow only blue light to pass;
   wherein the CF substrate further comprises a quantum dot layer disposed on the second substrate, and a protective layer disposed on the second substrate and the quantum dot layer between the second substrate and the common electrode;
   wherein the quantum dot layer emits white light when excited by backlight from a backlight module, and the quantum dot layer comprises red quantum dots, green quantum dots and blue quantum dots; and
   wherein the quantum dot layer is located between the backlight module and the PDLC layer so that the quantum dot layer receives the backlight from the backlight module to emit white light that is transmitted to and through the PDLC layer to generate red light, green light, and blue light from the red dye, the green dye, and the blue dye of the PDLC layer, such that the backlight emitting from the backlight module travels in sequence through the quantum dot layer and the PDLC layer to allow the backlight to be first converted into white light by the quantum dot layer, the white light then transmitting to the PDLC layer to be selectively converted into red light, green light, and blue light by the red dye, the green dye, and the blue dye of the PDLC layer.

2. The PDLC display panel as claimed in claim 1, wherein the seal layer comprises a sealing glue, and conductive glue disposed around the sealing glue; and
   the TFT substrate comprises: a first substrate, a plurality of gate scan lines and a plurality of data lines disposed on the first substrate, an insulation layer covering the first substrate and the gate scan lines, a pixel electrode disposed on the insulation layer, and a planarization layer covering the insulation layer and the pixel electrode;
   wherein the conductive glue is disposed outside the sealing glue to enclose the sealing glue in an interior space delimited by the conductive glue.

3. A manufacturing method for polymer dispersed liquid crystal (PDLC) display panel, which comprises:
   Step 1: providing a thin film transistor (TFT) substrate and a color filter (CF) substrate;
   the CF substrate comprising a second substrate, a common electrode disposed on the second substrate, and a color stop wall disposed on the common electrode;
   the color stop wall and the second substrate defining to form a plurality of pixel areas, with each pixel areas comprising a red sub-pixel groove, a green sub-pixel groove and a blue sub-pixel groove;
   Step 2: evenly mixing a red dye, a green dye and a blue dye respectively with liquid crystal (LC) molecules, photo initiators and pre-polymer to obtain a red LC mixture, a green LC mixture, and a blue LC mixture;
   Step 3: infusing the red sub-pixel groove, green sub-pixel groove and blue sub-pixel groove with the red LC mixture, green LC mixture and blue LC mixture respectively;
   Step 4: coating a sealing glue on the CF substrate or the TFT substrate, and coating a conductive glue around the sealing glue, then aligning to attach the TFT substrate and the CF substrate in a vacuum environment and curing the sealing glue to obtain an LC box; and
   Step 5: performing ultraviolet (UV) radiation on the LC box so that the photo initiators and the pre-polymer in the red LC mixture, green LC mixture and blue LC mixture polymerized to form polymer, the red dye, green dye and blue dye evenly dispersed in the polymer network formed by the polymer to form an PDLC film having red dye, an PDLC film having green dye and a PDLC film having blue dye, respectively; and finally forming a PDLC layer having a plurality of red sub-pixel portions, a plurality of green sub-pixel portions and a plurality of blue sub-pixel portions;
   wherein the UV light has a wavelength of 320-400 nm, luminance of 1-100 $W/cm^2$, and a radiation duration of 5-30 minutes;
   wherein the CF substrate provided in Step 1 further comprises a quantum dot layer disposed on the second substrate, and a protective layer disposed on the second substrate and the quantum dot layer between the second substrate and the common electrode;
   wherein the quantum dot layer emits white light when excited by backlight from a backlight module, and the quantum dot layer comprises red quantum dots, green quantum dots and blue quantum dots; and
   wherein the quantum dot layer is located between the backlight module and the PDLC layer so that the quantum dot layer receives the backlight from the backlight module to emit white light that is transmitted to and through the PDLC layer to generate red light, green light, and blue light from the red dye, the green dye, and the blue dye of the PDLC layer, such that the backlight emitting from the backlight module travels in sequence through the quantum dot layer and the PDLC layer to allow the backlight to be first converted into white light by the quantum dot layer, the white light then transmitting to the PDLC layer to be selectively converted into red light, green light, and blue light by the red dye, the green dye, and the blue dye of the PDLC layer.

4. The manufacturing method for PDLC display panel as claimed in claim 3, wherein in Step 5, the UV light has a wavelength of 365 nm, luminance of 85 W/cm², and the radiation duration is 15 minutes.

5. A liquid crystal display (LCD), which comprises:

a polymer dispersed liquid crystal (PDLC) display panel, and a backlight module; the backlight module being disposed at a side of the PDLC display panel closer to a color filter (CF) substrate;

the PDLC display panel comprising: a thin film transistor (TFT) substrate, a CF substrate, a PDLC layer sandwiched between the TFT substrate and the CF substrate, and a seal layer adhering the TFT substrate to the CF substrate;

the CF substrate comprising a second substrate, a common electrode disposed on the second substrate, and a color stop wall disposed on the common electrode;

the color stop wall and the second substrate defining to form a plurality of pixel areas, with each pixel areas comprising a red sub-pixel groove, a green sub-pixel groove and a blue sub-pixel groove; and the PDLC layer comprising: a red sub-pixel portion, a green sub-pixel portion, and a blue sub-pixel portion disposed respectively inside the red sub-pixel groove, the green sub-pixel groove and the blue sub-pixel groove; the red sub-pixel portion being a PDLC film having red dye, functioning as a filter to allow only red light to pass, the green sub-pixel portion being a PDLC film having green dye, functioning as a filter to allow only green light to pass, and the blue sub-pixel portion being a PDLC film having blue dye, functioning as a filter to allow only blue light to pass;

wherein the CF substrate further comprises a quantum dot layer disposed on the second substrate, and a protective layer disposed on the second substrate and the quantum dot layer between the second substrate and the common electrode;

wherein the quantum dot layer emits white light when excited by backlight from the backlight module, and the quantum dot layer comprises red quantum dots, green quantum dots and blue quantum dots; and wherein the quantum dot layer is located between the backlight module and the PDLC layer so that the quantum dot layer receives the backlight from the backlight module to emit white light that is transmitted to and through the PDLC layer to generate red light, green light, and blue light from the red dye, the green dye, and the blue dye of the PDLC layer, such that the backlight emitting from the backlight module travels in sequence through the quantum dot layer and the PDLC layer to allow the backlight to be first converted into white light by the quantum dot layer, the white light then transmitting to the PDLC layer to be selectively converted into red light, green light, and blue light by the red dye, the green dye, and the blue dye of the PDLC layer.

6. The LCD as claimed in claim 5, wherein the backlight module emits light of white or blue color.

* * * * *